(12) United States Patent
Wiedenman et al.

(10) Patent No.: US 7,797,472 B2
(45) Date of Patent: Sep. 14, 2010

(54) METHOD AND APPARATUS FOR PROVIDING OVERLAPPING DEFER PHASE RESPONSES

(75) Inventors: Gregory B. Wiedenman, Blaine, WA (US); Nathan A. Eckel, Fridley, MN (US); Kelvin S. Vartti, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 169 days.

(21) Appl. No.: 10/926,250

(22) Filed: Aug. 25, 2004

(65) Prior Publication Data
US 2009/0172225 A1 Jul. 2, 2009

(51) Int. Cl.
*G06F 13/00* (2006.01)
*G06F 12/00* (2006.01)
(52) U.S. Cl. .................. 710/107; 710/108; 710/200
(58) Field of Classification Search .......... 710/107, 710/108, 200
See application file for complete search history.

(56) References Cited

U.S. PATENT DOCUMENTS

| | | | |
|---|---|---|---|
| 4,716,523 A * | 12/1987 | Burrus et al. ........... 710/28 |
| 5,168,568 A * | 12/1992 | Thayer et al. ........... 710/125 |
| 5,404,482 A * | 4/1995 | Stamm et al. ........... 711/145 |
| 5,687,350 A * | 11/1997 | Bucher et al. ........... 711/140 |
| 5,752,076 A * | 5/1998 | Munson ................ 710/5 |
| 5,835,950 A * | 11/1998 | Cho et al. ............. 711/144 |
| 5,919,268 A * | 7/1999 | McDonald ............. 714/47 |
| 6,055,285 A * | 4/2000 | Alston ................. 375/372 |
| 6,526,483 B1 * | 2/2003 | Cho et al. ............. 711/154 |

* cited by examiner

*Primary Examiner*—Mark Rinehart
*Assistant Examiner*—Jeremy S Cerullo
(74) *Attorney, Agent, or Firm*—Robert P. Marley

(57) ABSTRACT

A multiprocessor system in which a defer phase response method is utilized that allows for a deferring agent to interrupt the normal flow of bus transactions once it gains control of system interface bus. The deferring agent is allowed to look ahead to determine if a continuous stream of defer phase cycles are pending transfer. If pending, the deferring agent will not release control of the bus until the pending defer phase cycles have been depleted. The look ahead feature allows expedited return of higher priority defer data, while minimizing bus dead cycles caused by interleaving defer phase cycles with normal bus traffic.

20 Claims, 6 Drawing Sheets

METHOD AND APPARATUS FOR PROVIDING OVERLAPPING DEFER PHASE RESPONSES

FIELD OF THE INVENTION

The present invention relates in general to data exchange, and more particularly, to a reduced overhead, defer phase data exchange.

BACKGROUND OF THE INVENTION

Today's computing architectures are designed to provide the sophisticated computer user with increased Reliability, Availability, and Scalability (RAS). To that end, the rise of the Microsoft Windows NT/2000 operating environment has presented a relatively low cost solution to the traditional high-end computing environment. The introduction of the Enterprise Edition has extended the scalability and resilience of the NT Server to provide a powerful and attractive solution to today's largest and most mission critical applications.

The Cellular MultiProcessing (CMP) architecture is a software/hardware environment that is developing as the enabling architecture that allows the Windows NT/2000 based servers to perform in such mission critical solutions. The CMP architecture incorporates high performance processors using special hardware and middleware components that build on standard interface components to expand the capabilities of the Microsoft Windows server operating systems. The CMP architecture utilizes a Symmetric MultiProcessor (SMP) design, which employs multiple processors supported by high throughput memory, Input/Output (I/O) systems and supporting hardware elements to bring about the manageability and resilience required for enterprise class servers.

Key to the CMP architecture is its ability to provide multiple, independent partitions, each with their own physical resources and operating system. Partitioning requires the flexibility required to support various application environments with increased control and greater resilience. Multiple server applications can be integrated into a single platform with improved performance, superior integration and lower costs to manage.

The objectives of the CMP architecture are multifold and may consist at least of the following: 1.) to provide scaling of applications beyond what is normally possible when running Microsoft Windows server operating systems on an SMP system; 2.) to improve the performance, reliability and manageability of a multiple application node by consolidating them on a single, multi-partition system; 3.) to establish new levels of RAS for open servers in support of mission critical applications; and 4.) to provide new levels of interoperability between operating systems through advanced, shared memory techniques.

The concept of multiprocessors sharing the workload in a computer relies heavily on shared memory. True SMP requires each processor to have access to the same physical memory, generally through the same system bus. When all processors share a single image of the memory space, that memory is said to be coherent, where data retrieved by each processor from the same memory address is going to be the same. Coherence is threatened, however, by the widespread use of onboard, high speed cache memory. When a processor reads data from a system memory location, it stores that data in high speed cache. A successive read from the same system memory address results instead, in a read from the cache, in order to provide an improvement in access speed. Likewise, writes to the same system memory address results instead to writes to the cache, which ultimately leads to data incoherence. As each processor maintains its own copy of system level memory within its cache, subsequent data writes cause the memory in each cache to diverge.

A common method of solving the problem of memory coherence in SMP dedicated cache systems is through bus snooping. A processor performs bus snooping by monitoring the address bus for memory addresses placed on it by other processors. If the memory address corresponds to an address whose contents were previously cached by any other processor, then the cache contents relating to that address are marked as a cache fault for all processors on the next read of that address, subsequently forcing a read of system memory.

A common problem with SMP systems, however, is the excessive time commitment involved for bus transactions and bus transaction management when individual acknowledgments are required for each request and its associated response(s). In particular, data previously requested from a requesting agent may be deferred when, for example, a cache fault is detected. In such an instance, data access from system memory is required, which generally requires more time to execute than is required for retrieving information from the cache. The response to the request may therefore be deferred until such time that the data becomes available from system memory. Once the deferred data is available, a defer phase is entered, whereby the deferred data may be transferred to the requesting agent.

A problem with the defer phase, however, is that the deferring agent must gain ownership of the data bus each time deferred data is to be transferred, thereby delaying any other transfers that may be pending. The delay is further exacerbated when deferred data from multiple requests are pending. A complete defer cycle may be required for each deferred data response, resulting in cumulative bus idle cycles due to the bus handshaking that is required to resume normal bus activity. Thus, prior art methodologies that require bus ownership for each deferred data transfer increase the delay caused by interleaved defer phases.

Accordingly, a need exists to provide a method and apparatus that obviates the need to provide individual acknowledgments to similar transactions, such as defer phase data transfers, but rather allows streaming of similar transactions to reduce bus transaction time.

SUMMARY OF THE INVENTION

The present invention is directed to a method and apparatus that alleviates problems associated with the prior art by reducing the amount of bus control overhead required when multiple defer phase responses are pending. In general, the present invention allows a deferring agent to look ahead and determine if a continuous stream of defer phase bus cycles are required. If required, the deferring agent does not release ownership of the data bus, but rather maintains ownership of the data bus so that any pending defer phase data transfers may be accommodated. Thus, the present invention provides for a faster return of the higher priority defer data, and minimizes the bus dead cycles caused by interleaving deferred phases with normal bus traffic.

In accordance with one embodiment of the invention, a method of reducing bus interface control between a bus interface controller and a transaction pipeline during deferred response transactions is provided. The method comprises seizing control of a bus interface in response to receiving a first defer phase response and determining whether other defer phase responses are received. The method further comprises maintaining control of the bus interface in response to determining that other defer phase responses are received. The first defer phase response is linked with the other defer phase responses to maintain control of the bus interface while data associated with the linked defer phase responses is transmitted on the bus interface.

In accordance with one embodiment of the invention, a defer phase response subsystem comprises a transaction pipeline that is adapted to receive a plurality of defer phase responses and is coupled to provide a defer signal to indicate the presence of the plurality of defer phase responses. The defer phase response subsystem further comprises a bus interface controller that is coupled to the transaction pipeline to receive the plurality of defer phase responses and is coupled to transmit data associated with the plurality of defer phase responses on a bus interface. The defer signal causes the bus interface controller to maintain control of the bus interface during transmission of the data associated with the plurality of defer phase responses.

In accordance with one embodiment of the invention, a multiprocessing system comprises a plurality of multiprocessors sharing a common system bus with access to a common memory pool and a node controller coupled to each of the plurality of multiprocessors. The node controller comprises a transaction pipeline that is adapted to receive a plurality of defer phase responses and is coupled to provide a defer signal to indicate the presence of the plurality of defer phase responses. The node controller further comprises a bus interface controller coupled to the transaction pipeline to receive the plurality of defer phase responses and is coupled to transmit data associated with the plurality of defer phase responses on a bus interface. The defer signal causes the bus interface controller to maintain control of the bus interface during transmission of the data associated with the plurality of defer phase responses.

In accordance with yet another embodiment of the invention, a multiprocessing system includes a common system bus accessible to a common memory pool. The system includes means for receiving a first defer phase response, which is associated with defer phase data accessed from the common memory pool. The multiprocessing system further comprises a means for controlling the common system bus to facilitate data transfer of the defer phase data associated with the first defer phase response, and a means for detecting other defer phase responses. Control of the common system bus is maintained during transmission of defer phase data associated with the other defer phase responses.

The above summary of the present invention is not intended to describe each disclosed embodiment of the present invention. The figures and detailed description that follow provide additional example embodiments and aspects of the present invention.

DETAILED DESCRIPTION

Figure 1:
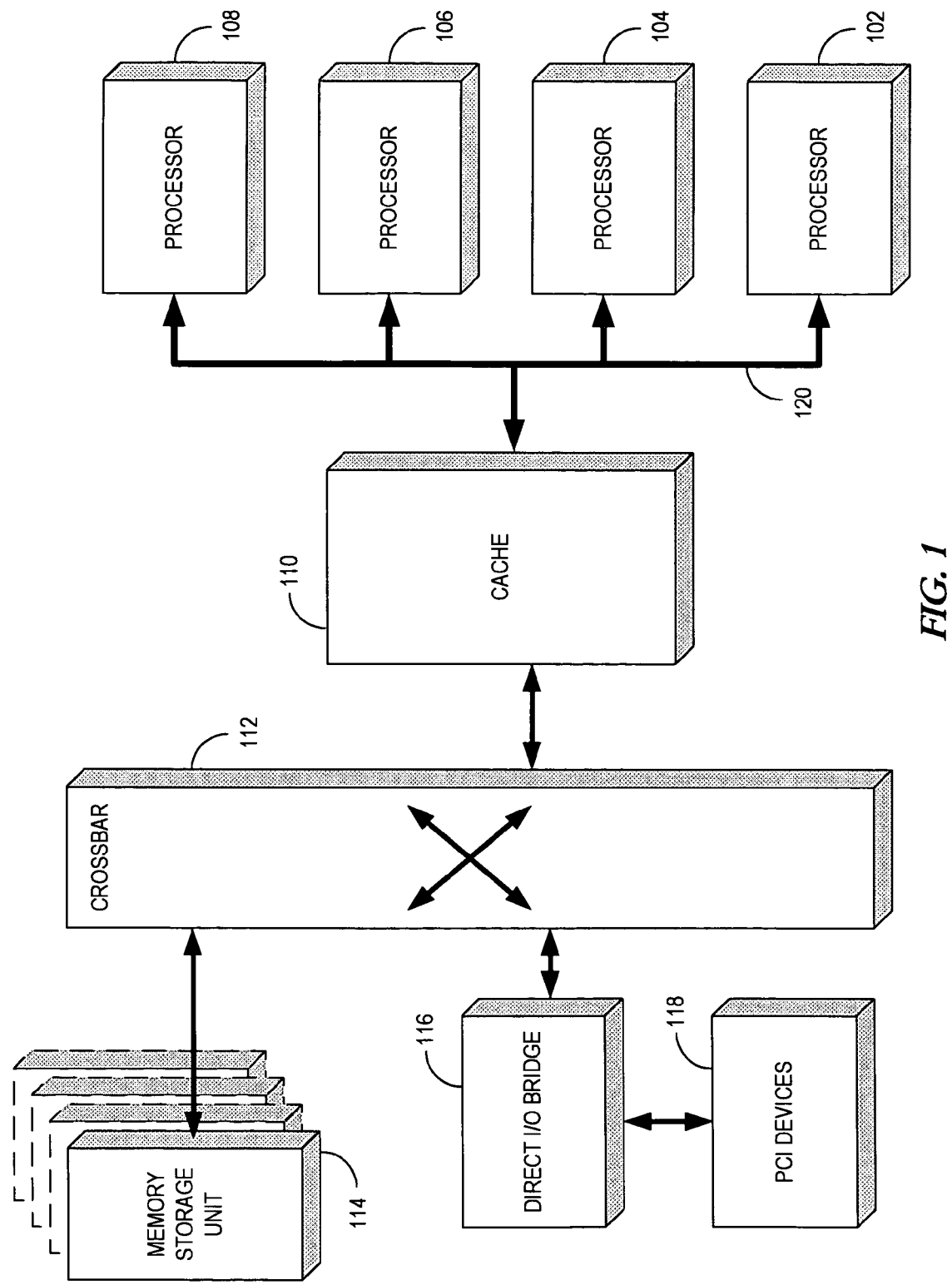
FIG. 1 illustrates a block diagram of a representative processing cell in which the principles of the present invention may be applied.

FIG. 1 illustrates an exemplary block diagram of a processing cell in accordance with the present invention. A typical processing cell, or sub-pod, is comprised of multiple Central Processing Units 102-108 and a corresponding Cache 110. The processing units may be implemented using any suitable processor, such as, for example, the UNISYS ES7000, INTEL processors such as the McKinley, Itanium or Xeon families, etc. Each of processors 102-108 share Cache 110 through bus 120, where Bus 120 may serve up to, for example, four processors 102-108. Memory Storage Units 114 provides a shared memory pool for Processors 102-108 through non-blocking cross-bar 112. Direct I/O Bridge 116 provides high-throughput access to Peripheral Component Interconnect (PCI) devices 118. It should be noted that the present invention is not limited for use with only those processors listed above, but may be used with any processor that is compatible within a multi-processing environment.

Memory Storage Unit 114 may consist of up to four main memory banks each of which may contain a maximum of 16 GigaBytes of Random Access Memory (RAM). Likewise, Cache 110 may comprise up to four banks of cache (not shown), each cache bank may contain up to 32 MegaByte of RAM, which is on the order of five times faster than Memory Storage Unit 114 RAM. Each cache bank has a dedicated, direct connection to each of Memory Storage Units 114, each direct connection being supported by crossbar 112. Memory Storage Unit 114 has a typical mainframe design, such that each Memory Storage Unit 114 may handle hundreds of access requests concurrently. Even higher performance may be realized by allowing data interleaving between each Memory Storage Unit 114. When data interleaving is enabled, data may be spread across all Memory Storage Units 114 and may be accessed in parallel by any one of Processors 102-108 and/or Cache 110. Crossbar 112 allows for fast, consistently low latency, high bandwidth transmissions between Cache 110, Memory Storage Units 114, and I/O bridge 116.

Multiple sub-pods, like the sub-pod illustrated in FIG. 1, may be combined to provide a highly scalable solution for today's demanding enterprise environments in accordance with the present invention. A single configuration of multiple sub-pods, for example, may include a total of 32 processors, along with eight cache modules, 64 GB of main memory, four cross-bars and eight direct I/O bridges to support a total of 96 PCI slots.

Figure 2:
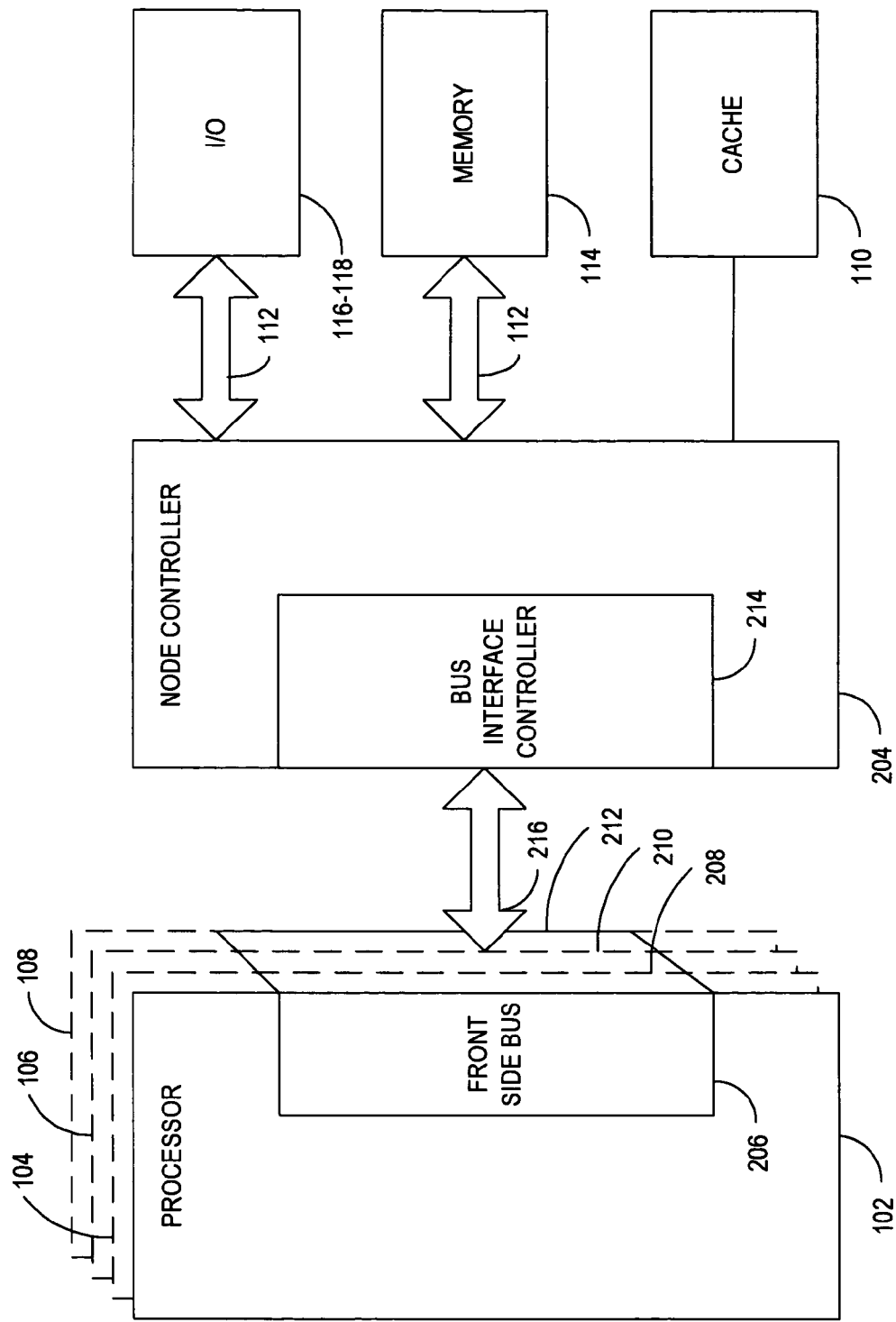
FIG. 2 illustrates a block diagram of the bus interaction of the exemplary processing cell of FIG. 1.

FIG. 2 illustrates an exemplary block diagram illustrating bus components, e.g., Front Side Bus 206-212, within Processors 102-108, respectively, and the associated bus controller, e.g., Node Controller 204, required to negotiate bus access by Processors 102-108 to I/O 116-118, Memory 114, and Cache 110. Node Controller 204 provides the processor system Bus Interface Controller 214 and cache controller chip for up to four processors 102-108 operating on system bus 216. Node Controller 204 resides on the sub-pod module and is the central agent on the processor system bus to allow interactions between Processors 102-108, Cache 110, Memory 114, and I/O 116-118.

Node Controller 204 facilitates access to Cache 110, providing quick access to commonly used cache lines that are requested on System Bus 216. The data portion of Cache 110 resides in Static RAM (not shown) that is external to Node Controller 204 and a corresponding on-chip tag RAM (not shown) keeps track of state and control information for the resident cache lines. In operation, copies of frequently accessed state and control information, called cache blocks or cache lines, are maintained in the SRAM portion of Cache 110. Each cache block or line is marked with a block address, referred to as a tag, so that Cache 110 knows to which part of the SRAM memory space the cache line belongs. The collection of cache tags for each memory block contained within the SRAM is contained within the on-chip tag RAM. For example, if cache line (e.g. B) containing data entries (e.g. D) is assigned to a portion of SRAM called (e.g. M), then B is in the on-chip tag RAM and D is contained within the SRAM of Cache 110. Cache 110 is a non-inclusive cache, meaning that not all cache lines resident in the processor's cache (not shown) are necessarily resident within Cache 110.

In operation, Node Controller 204 decodes Front Side Bus 206-212 transactions on system bus 216 into two main types: 1.) coherent memory requests; and 2.) non-coherent requests. Memory within a multiprocessor system in which every memory read and every memory write is instantly known by each processor within the system is known as coherent memory access. Coherent memory access, therefore, must communicate the memory accessed by one processor to the other processors on the bus through the use of a bus snooping function, so that stale data is not used. Coherent memory requests on System Bus 216 are monitored by the bus snooping function and communicated to all Processors 102-108 on System Bus 216. The non-coherent requests, on the other hand, correspond to requests such as memory-mapped I/O, interrupts, and other special transactions which do not use Cache 110.

Communication between Node Controller 204, I/O 116-118, Memory 114 and Cache 110 is conducted via crossbar 112. Crossbar 112 is a multi-input, multi-output, non-blocking electronic switch, where access from Node Controller 204 and external components is unimpeded, thus removing any potential bottlenecks.

The number of Processors 102-108 operating in conjunction with Node Controller 204 is advantageously limited in order to avoid excessive bus contention on System Bus 216, especially in consideration of the bus snooping function. Data transfer on System Bus 216 may be implemented on varying width buses to include 32, 64 and 128 bit buses and beyond. The clocking rate on System Bus 216 is usually in the range of several hundred MegaHertz (MHz) and data may be transferred on both the rising and falling edges for double-pumped operation of the system bus clock to achieve an effective System Bus 216 bandwidth of several GigaHertz (GHz). In addition, varying phases of the system bus clock may be used to implement even higher effective bus clock rates, such as providing two rising edges and two falling edges within a clock period for a quad-pumped operation of the system bus clock. Processors 102-108 are responsible for obeying any bus specification that may exist for System Bus 216 between Front Side Bus 206-212 and Bus Interface Controller 214.

Bus Interface Controller 214 interfaces Node Controller 204 to Front Side Bus 206-212 for each of Processors 102-108. As discussed in more detail later, Bus Interface Controller 214 provides at least the following functions: 1.) a request queue that allows Node Controller 204 or processors 102-108 to generate bus requests; 2.) an in-order queue to receive bus requests from processors 102-108; 3.) a snoop interface to provide address and function information necessary to snoop Node Controller 204 tag RAM and then to provide the tag status to the snoop interface; 4.) response cycle generation to complete bus operations; 5.) generation of deferred phase operations; and 6.) a data transfer interface to provide the control and necessary data queues to transfer data bus reads, writes, interrupts and special transactions.

Figure 3:
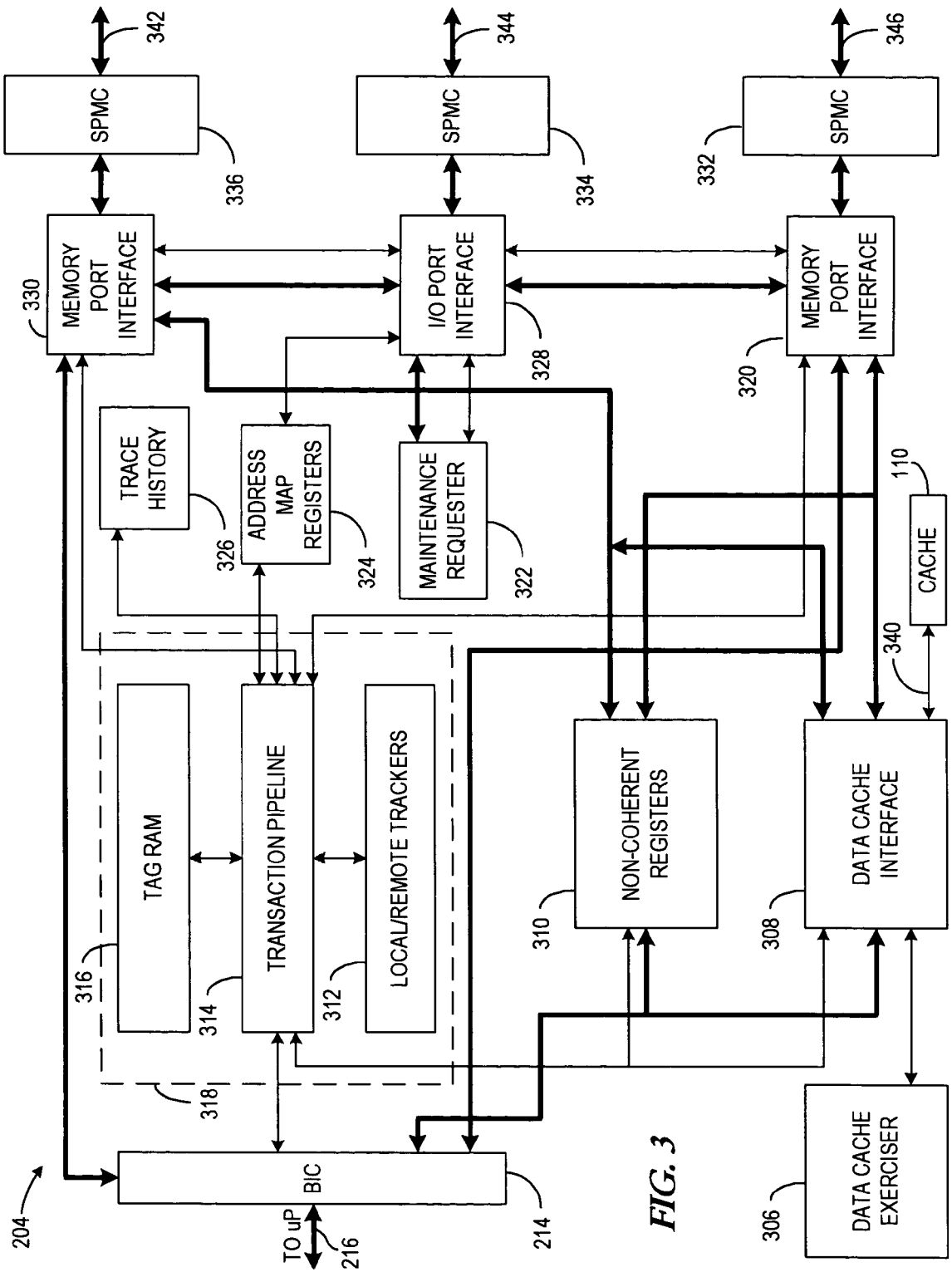
FIG. 3 illustrates a block diagram of a representative node controller in accordance with one embodiment of the present invention.

FIG. 3 illustrates an exemplary block diagram of Node Controller 204 in accordance with the principles of the present invention and is interconnected as follows, whereby data bus connections are denoted in bold. Bus Interface Controller 214 connects to System Bus 216, which is the system bus for the processors attached to the particular sub-pod of interest. Bus Interface Controller 214 interconnects through a data bus to Memory Port Interfaces 320 and 330 as well as to Data Cache Interface 308. Transaction Processor 318 is comprised of Tag RAM 316, Transaction Pipeline 314 and Local/Remote Trackers 312. Tag RAM 316, Transaction Pipeline 314 and Local/Remote Trackers 312 are each interconnected through a control bus and Transaction Pipeline 314 is interconnected to Bus Interface Controller 214 through a control bus. Transaction Pipeline 314 also provides control through a control bus to Address Map Registers 324, Trace History 326, Memory Port Interfaces 330 and 320. A data bus interconnects Bus Interface Controller 214 and Non-Coherent Registers 310 and Data Cache Interface 308. A data bus also interconnects Non-Coherent Registers 310 and Data Cache Interface 308 to Memory Port Interfaces 320 and 330. Data Cache Interface 308 is interconnected to cache 110 that may be separately located, e.g. off-chip, from Data Cache Interface 308. Maintenance Requestor 322 and I/O Port Interface 328 are interconnected by both a data bus and a control bus. A control bus interconnects Address Map Registers 324 to I/O Port Interface 328. Data and control bus interfaces exist between I/O Port Interface 328 and Memory Port Interfaces 320 and 330. Scalability Port Memory Controllers 332, 334, and 336 interconnect through a data bus to Memory Port Interface 320, I/O Port Interface 328, and Memory Port Interface 330, respectively. Data buses 342 and 346 interconnect Scalability Port Memory Controllers 336 and 332, respectively, to the respective Memory Storage Unit 114 associated with the particular sub-pod assembly. It should be noted that dual data buses 342 and 346 are provided to Node Controller 204 to allow for fault tolerant functionality, parallel processing, etc. Scalability Port Memory Controllers 344 transfer data between I/O Port Interface 328 and PCI devices 118.

In operation, Node Controller 204 provides all the necessary functions required to facilitate processor bus operations on Bus Interface 216. As discussed more fully below and in relation to FIG. 4, Node Controller 204 facilitates at least seven primary functions: 1.) Out-Going Queue for outgoing requests to be sent out to Bus Interface Controller 214; 2.) In-Order Queue for incoming requests from Bus Interface Controller 214; 3.) Response Control for all bus requests; 4.) Datapath for data transfer and control between Memory Storage Units; 5.) I/O interface module to facilitate access to PCI devices; 6.) History Stack for Bus Interface Controller 214 history capture; and 7.) Error Checking to collect and check all errors. The other major interfaces accommodated by Node Controller 204 include the Bus Interface Controller 214 to Transaction Pipeline 314 interface which handles control signals and address/function signals, data transfers between Bus Interface Controller 214 and Data Cache Interface 308, data transfers between Bus Interface Controller 214 and Memory Storage Unit 0 (not shown) on interface 342, data transfers between Bus Interface Controller 214 and Memory Storage Unit 1 (not shown) on interface 346 and non-coherent data transfers between Bus Interface Controller 214 and Non-Coherent Registers 310.

The Out-Going Queue function receives requests to be sent to Bus Interface Controller 214 from either Transaction Pipeline 314, Memory Port Interface 330, or Memory Port Interface 320. The requests are individually strobed into a priority selection block (not shown) which acknowledges and grants execution of the request according to a prioritized selection algorithm, or held for later processing within the Out-Going Request Queue (not shown). Each of the requesting entities places information concerning the request type, which may be represented by a 3-5 bit digital code identifying one of a number of possible request types. Likewise, an In-Order Queue (not shown) is utilized to store requests received from the processor on Bus Interface Controller 214 pertaining to, for example, snoop requests or write transactions sent from the processor.

The request signals comprise, for example, an active low address field used to identify the recipient of the request as well as a parity field to maintain an even number of active low signals on the address bus. Likewise, the request field is maintained with even parity by an associated request parity bit. The lower three bits of the address field are mapped into byte enable signals, which allows for a programmable number of bytes to be transferred in a given transaction. The programmable number of bytes for transfer in a single clock transition is, for example, 0 to 8 bytes.

Response signals are generated in response to the requests received and provide status for the requests that have been received. Each response signal comprises a response status field, whose parity is held even by a response parity field. Additionally, a Target Ready bit is maintained within the response signal to allow the receiving party to signal its readiness for write data or writeback data, if a data write is appropriate for the particular request. For transactions with an implicit writeback, the Target Ready bit is asserted twice, first for the write data transfer and second for the implicit writeback data transfer.

Data response signals control the transfers of data on Bus Interface 216. The agent responsible for transferring data on the data bus is responsible for indicating that data on the bus is valid and that the data should be latched. The data bus agent, for example, should assert a ready bit at both the rising edge and falling edge of the bus clock for double-pumped operation. Additionally, the ready bit may be deasserted by the transmitting entity in order to insert wait states into the data phase. Bus Interface 216 may represent, for example, a 32, 64, or 128 bit width and may be enabled for individual bytes within Bus Interface 216. For example, if Bus Interface 216 is 64 bits wide, then the bus is capable of transferring 8 bytes of data at a time, where each byte equals 8 bits. A 3-bit byte enable field, for example, could then be used to provide information as to which bytes of data are valid on the 64-bit bus. Additionally, the data transferred on Bus Interface 216 may be Error Correction Coded regardless of which bytes are enabled.

Figure 4:
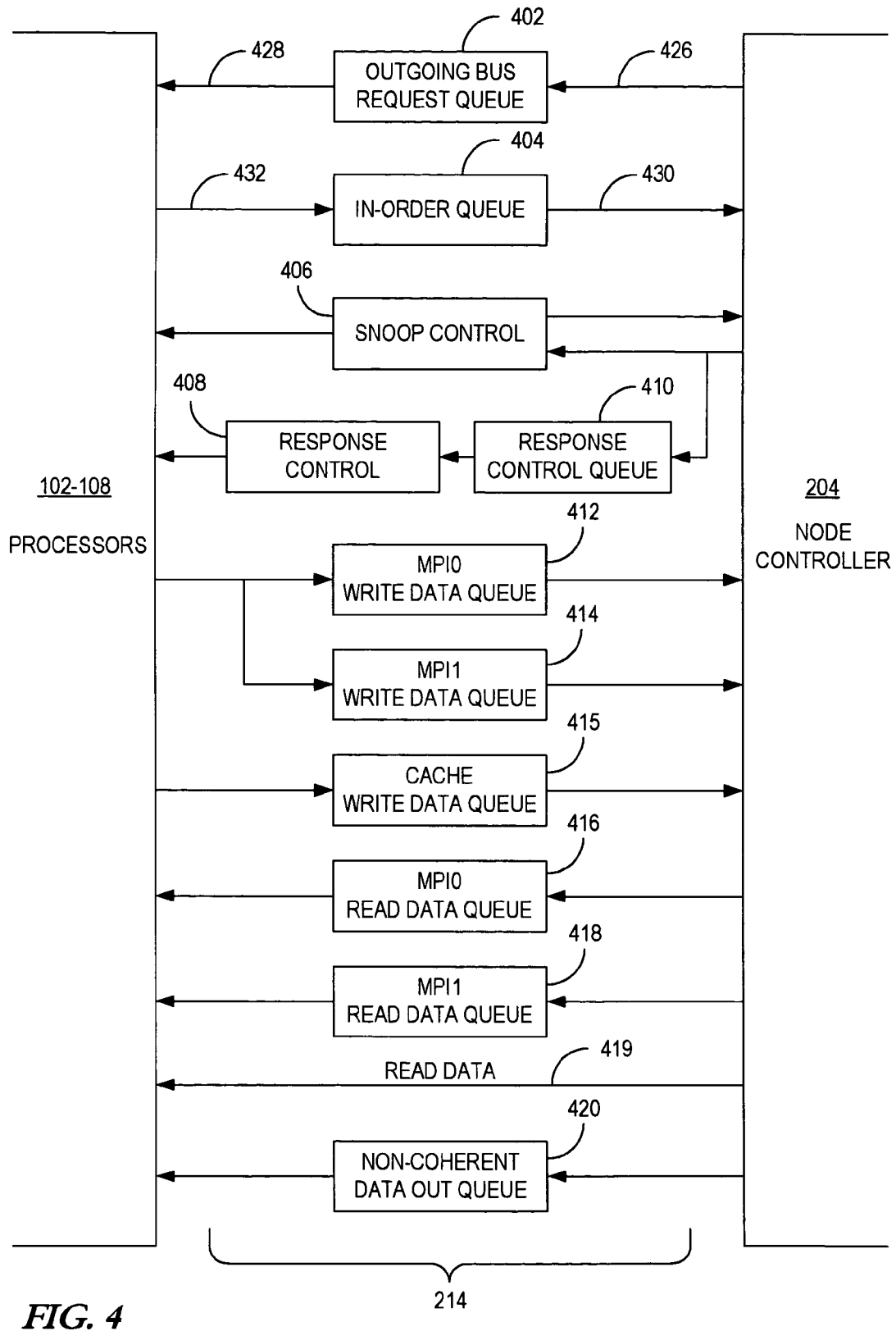
FIG. 4 illustrates a functional block diagram of the exemplary bus interface controller of FIG. 3.

FIG. 4 illustrates an exemplary functional block diagram of Bus Interface Controller 214. Processors 102-108 may represent one of many processors adapted to contemporaneously interface with Node Controller 204. Generally speaking, there exist five phases of operation of Bus Interface Controller 214: 1.) Arbitration; 2.) Request; 3.) Snoop; 4.) Response; and 5.) Data. Arbitration phase operation of Bus Interface Controller 214 allows for one of Processors 102-108 to obtain control of Bus Interface 216, or alternatively to allow Node Controller 204 to obtain control of Bus Interface 216, during one or more bus clock cycles. Arbitration phase is entered when one of Processors 102-108 asserts a bus request signal or when Node Controller 204 asserts the bus request signal. A number of agents may simultaneously arbitrate for the request bus, where Processors 102-108 represent symmetric agents and Node Controller 204 represents a priority agent. Owning the bus is a necessary pre-condition for initiating a transaction. The symmetric agents arbitrate for the bus based on a round-robin rotating priority scheme. Priority agent bus requests override symmetric agent bus requests, where the priority agent bus request is always the next bus owner. The response to the bus request signal is assertion of a bus priority signal to the requesting device having priority, thereby relinquishing control of the bus to either the symmetric agents or the priority agent. Bus blocking control may be asserted by any of the bus agents to block further transactions from being issued to the request bus, in such instances, for example, when system resources, such as address and data buffers, are about to become temporarily busy or filled and cannot accommodate another transaction.

The request phase of Bus Interface Controller 214 is entered when either Processors 102-108 or Node Controller 204 have successfully arbitrated for bus control. With reference to both FIGS. 3 and 4, request signals may be provided by Transaction Pipeline 314, Memory Port Interface 330, and Memory Port interface 320 via Node Controller 204, and bus request signals may be provided by Processors 102-108 in order to generate snoop requests. Assertion of an address strobe signal defines the beginning of the request transaction. An active low address is provided along with the address strobe signal as part of the request. The low three bits are mapped into byte enable signals to accommodate, for example, 0 through 8 byte transfers per clock cycle. Even parity is used to insure that an even number of active low signals exist throughout the entire request signal.

Outgoing Bus Request Queue 402 receives bus requests from Node Controller 204 via interface 426 and provides the requests via Interface 428 to the addressed Processor 102-108 of the request. Likewise, In-Order Queue 404 receives bus requests from Processors 102-108 via interface 432 and provides the bus requests to the addressed recipient via bus 430. Each of Outgoing Bus Request Queue and In-Order Queue is limited, for example, to a depth of 8 and are responsible for queuing up requests from Node Controller 204 and Processor 102-108, respectively. Handshake signals are used between Outgoing Bus Request Queue 402 and Node Controller 204 and also between In-Order Queue 404 and Processor 102-108 in order to throttle the number of requests received by each of Queues 402 and 404. Additional signaling is provided by Outgoing Bus Request Queue 402 when the queue has been filled to a predetermined depth. If, for example, the predetermined depth is 5 and the overall queue depth is 8, then 3 extra slots are provided in Outgoing Bus Request Queue 402 to allow for potential requests that may be waiting in Transaction Pipeline 314. Each of Processors 102-108 monitors the In-Order Queue 404 and will stop sending requests when the queue is full.

Snoop phase operation is controlled through the combined operation of In-Order Queue 404 and Snoop Control 406 and is required to maintain cache coherency. With regard to FIGS. 2 and 3, Memory Port Interfaces 330 and 320 provide write and read access to, for example, Memory 114. Memory reads are cached into Cache 110 by Data Cache Interface 308, whereby subsequent access to the same memory space results in a memory read from Cache 110 instead of a memory read from Memory 114, resulting in a shorter memory access time. Memory 114, however, represents shared memory space to each of Processors 102-108. Data read from Memory 114 and subsequently cached during one clock cycle from a first of Processors 102-108 may be invalidated by a subsequent write to the same address in Memory 114 by a second of Processors 102-108.

Snoop Control 406 is, therefore, used to provide snoop control of Cache 110 to Processors 102-108, while In-Order Queue 404 receives snoop requests from Processors 102-108. In operation, snoop signals from Snoop Control 406 allow Processors 102-108 to determine whether: 1.) an unmodified, requested cache line exists within Cache 110, resulting in a cache hit; 2.) a modified, requested cache line exists within Cache 110, resulting in a cache hit to a modified cache line; or 3.) no cache line exists within Cache 110, resulting in a cache miss. The snoop signals from Snoop Control 406 are used to maintain cache coherency at the system level and, therefore, provide an indication that the on-chip cache line within the snooping agent, e.g., Processors 102-108, is valid or invalid, whether the Cache 110 line is in a modified, or dirty, state or whether the transaction should be extended until such time that a valid snooping state may be determined.

The response phase of Bus Interface Controller 214 is controlled by Response Control Queue 410 and Response Control 408 and are responsive to requests received by In-Order Queue 404. A responding agent within Node Controller 204 is responsible for processing requests at the top of In-Order Queue 404, where the responding agent is the agent being addressed by the request, e.g., Memory Port Interface 320 or 330 during a memory read of Memory 114 of FIG. 2 or alternately a memory read of Cache 110, if cached memory is present. Each response contains a response identifier, which is used to provide a response code to be placed on Bus Interface 216 during the response phase of Bus Interface Controller 214. The response code identifies, for example, a result of a bus snoop initiated by one of Processors 102-108. The results of the bus snoop may indicate, for example, that normal data was found, that no data was found, that the request is to be deferred, or that the request is to be retried. It should be noted that if the response code indicates that either a retry or deferral is necessary and that Snoop Control 406 indicates that Cache 110 is in a modified state, then the retry or defer response code will be implicitly changed to an automatic writeback from Memory 114 of FIG. 2, where Cache 110 will provide itself as a target to maintain data coherency between Cache 110 and Memory 114.

The data phase of Bus Interface Controller 214 operates to transfer data between Memory Port Interface 320 and related Memory Port Interface 0 Write Data Queue 412 and Memory Port Interface 0 Read Data Queue 416 and between Memory Port Interface 330 and related Memory Port Interface 1 Write Data Queue 414 and Memory Port Interface 1 Read Data Queue 418. Cache data may also be transferred from Processors 102-108 to cache 110 via the Cache Write Data Queue 415, and to Processors 102-108 as shown on path 419. Non-coherent Data Out Queue 420 operates to transfer data contained from local registers within Node Controller 204 to Processors 102-108. A byte enable field may be used to enable multiple data bytes on the data bus per transfer cycle.

As discussed above in relation to the response phase of operation of Bus Interface Controller 214, data from a responding agent, e.g., Memory Port Interface 330 or 320 during a memory read of Memory 114 or alternately a memory read of Cache 110, may be deferred. In such an instance, a defer phase is entered, whereby the deferred data is delivered to the requesting processor.

One problem with defer phase, however, is that the deferring agent must gain ownership of the data bus each time deferred data requires transfer, thus delaying any other processor transfers that may be pending. Requiring bus ownership each time a transfer of deferred data is required adds to the delay caused by interleaved defer phases. Each defer cycle, for example, results in "bus dead cycles" due to the bus handshaking that is required to resume normal bus activity.

In accordance with one embodiment of the present invention, a defer phase response method is utilized that allows a deferring agent to return data in response to a deferred operation without the added overhead of a full bus operation. The defer phase allows the deferring agent, e.g. Node Controller 204, to interrupt the normal flow of bus transactions once it gains control of Bus Interface 216, by issuing a defer strobe (IDS) on the bus. Once the IDS is issued, data transfer of the deferred data may commence.

Figure 5:
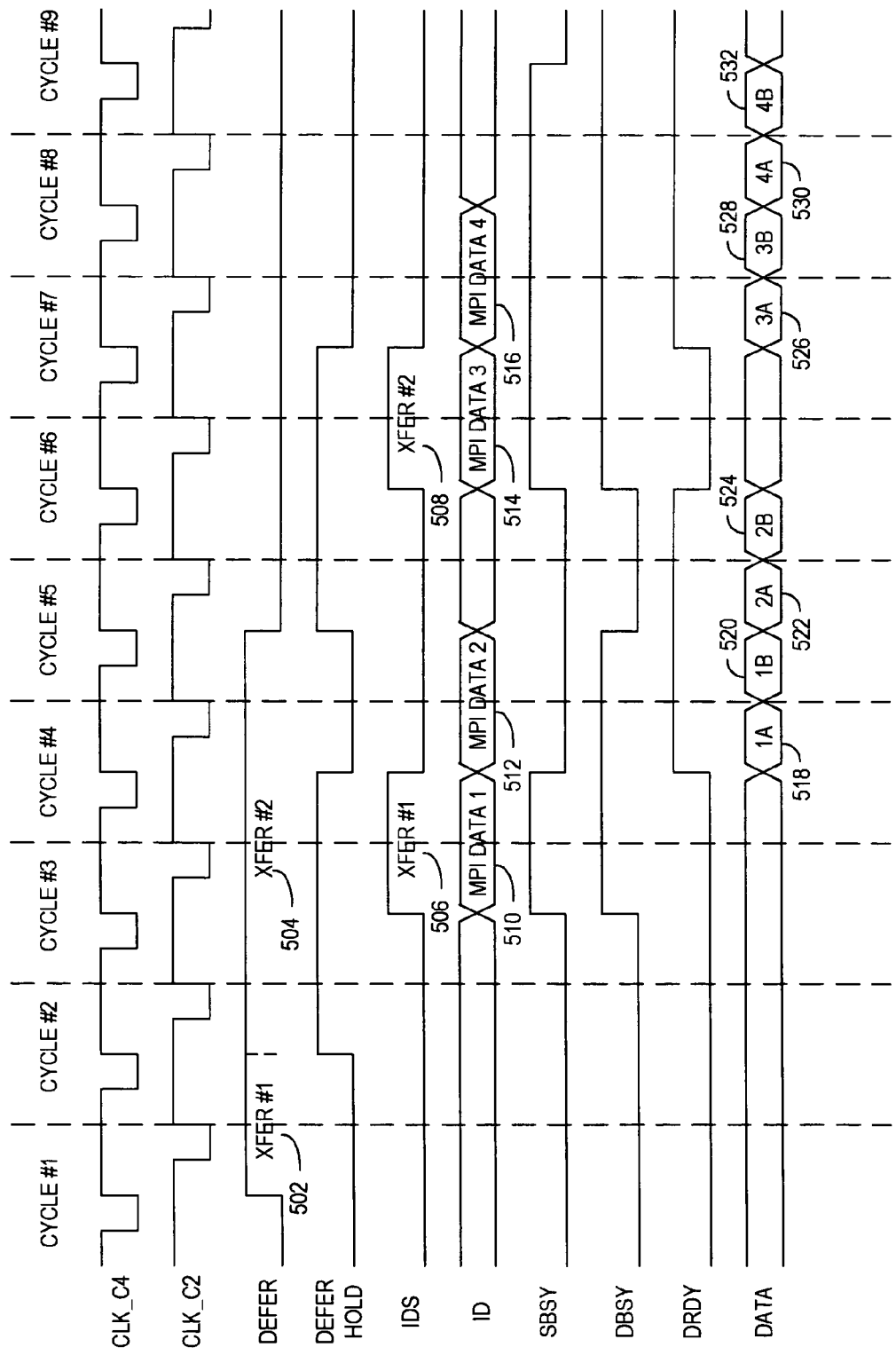
FIG. 5 illustrates an exemplary timing diagram in accordance with one embodiment of the present invention.

In accordance with the present invention, a deferring agent is allowed to look ahead to determine if a continuous stream of defer phase cycles are pending transfer. If pending, the deferring agent will not release control of the bus until the pending defer phase cycles have been depleted. The look ahead feature allows expedited return of higher priority deferred data, while minimizing bus dead cycles caused by interleaving defer phase cycles with normal bus traffic. FIG. 5 illustrates a timing diagram according to the principles of the present invention in relation to linked defer phase responses.

Referring to the timing diagram of FIG. 5 with continuing reference to Transaction Pipeline 314, the relationship between Transaction Pipeline 314 and Bus Interface Controller 214 is illustrated when a defer phase transaction is required. During Cycle #1, Transaction Pipeline 314 asserts signal DEFER, indicating the need for defer phase transfer XFER #1 502. In Cycle #2, Bus Interface Controller 214 handshakes by asserting signal DEFER HOLD, indicating receipt of defer phase bus information and that execution of the bus defer phase transfer will commence. Signal ID relating to MPI DATA 1 510 through MPI DATA 2 512 refers to defer phase data transmitted by either of Memory Port Interface 330 or Memory Port Interface 320, where the assertion of signal SBSY indicates the initial transfer of Memory Port Interface Data. Signal DEFER HOLD stays active until IDS signal 506 deasserts and data transfer of signal DATA 1A 518 through DATA 2B 524 has started, where signals DBSY and DRDY are asserted to indicate that Memory Port Interface data is pending and available, respectively, on bus interface 216. It should be noted that data is transferred at each rising edge of signal CLK_C2 and signal CLK_C4 on bus interface 216, thus establishing a 2× transfer rate on bus interface 216 as compared to the data transfer of MPI DATA 1 510 through MPI DATA 2 512.

During Cycle #2, Transaction Pipeline 314 looks ahead and finds that second defer phase transfer XFER #2 504 also requires service. Accordingly, instead of deasserting signal DEFER in Cycle #2, signal DEFER remains asserted until Cycle #5, thus linking first and second defer phase transfers XFER #1 502 and XFER #2 504, respectively. Since signal DEFER remains active while signal DEFER HOLD is active, Bus Interface Controller 214 knows that ownership of bus interface 216 is still required and thus does not relinquish bus ownership. Maintaining ownership of the bus for the linked defer phase transfer allows for consecutive defer transfers while obviating the need for normal bus transfer handshakes.

The second defer phase transfer is started in Cycle #4 when signal DEFER HOLD is deasserted while signal DEFER remains asserted. Signal ID representing MPI DATA 3 514 and MPI DATA 4 516 relates to defer phase data transferred from Memory Port Interface 330 or 320 in response to defer phase transfer XFER #2 508. The corresponding data transferred on bus interface 216 relating to signal DATA 3A 526 through DATA 4B 532. It should be noted that the deassertion of signal DEFER in Cycle #5 indicates that normal bus interface traffic may commence, once data transfer relating to defer phase transfer XFER #2 508 has finished.

Figure 6:
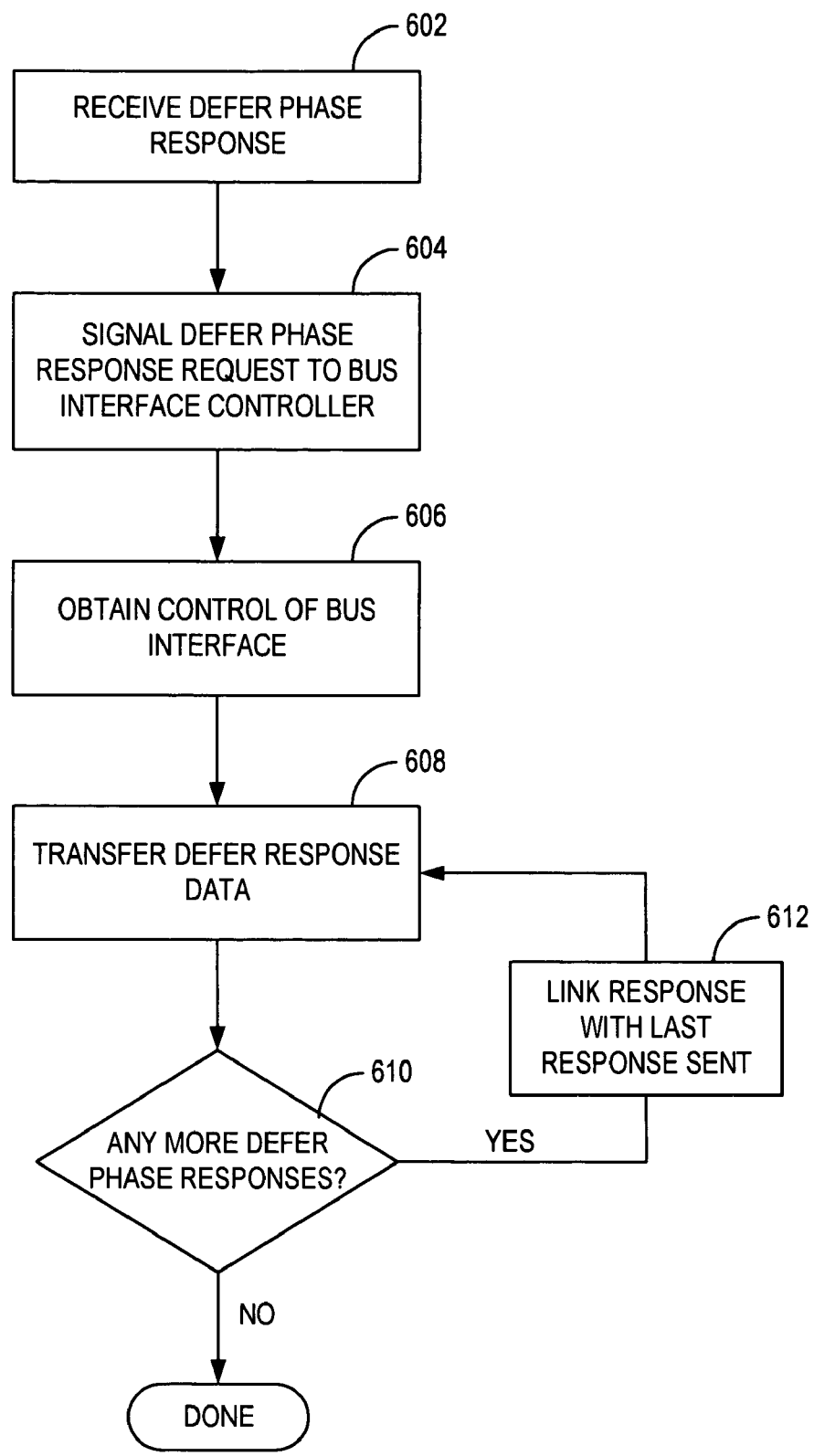
FIG. 6 illustrates a flow diagram in accordance with one embodiment of the present invention.

FIG. 6 illustrates an exemplary flow diagram of linked defer phase transfers according to the present invention. In step 602, a defer phase response is received by Transaction Pipeline 314 from either Memory Port Interface 330 or 320. The defer phase response is signaled to Bus Interface Controller 214 in step 604 and control of the interface is obtained in step 606. Transfer of the defer phase response data is then implemented in step 608. If any more defer phase responses exist, the defer phase responses are linked in step 612 and transferred in step 608, without the need to re-gain control of the bus interface. At the same time, normal bus transaction handshaking is not required.

In conclusion, a method and apparatus has been presented that allows the streaming of defer phase responses, thus obviating the need to acknowledge each individual defer phase response individually. In so doing, a reduction in the time and complexity required for defer phase responses is reduced.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method of reducing bus interface control between a bus interface controller and a transaction pipeline during deferred response transactions, the computer-implemented method comprising:
    seizing control of a bus interface with the bus interface controller in response to receiving a first defer phase response for a first processor of a plurality of processors, the bus interface controller and the transaction pipeline being part of a central node controller that negotiates bus access for the plurality of processors;
    performing a look ahead with the transaction pipeline to determine whether other defer phase responses are received for the first processor; and
    maintaining control of the bus interface with the bus interface controller in response to transaction pipeline determining that other defer phase responses are received, wherein the first defer phase response is linked with the other defer phase responses to maintain control of the bus interface while data associated with the linked defer phase responses is transmitted on the bus interface.

2. The computer-implemented method according to claim 1, wherein seizing control of the bus interface comprises:
    issuing a defer signal from the transaction pipeline to the bus interface controller; and
    responding to the defer signal by activation of a defer hold signal from the bus interface controller.

3. The computer-implemented method according to claim 2, wherein seizing control of the bus interface further comprises:
    transferring a first set of data associated with the first defer phase response from a memory port interface to the transaction pipeline; and
    transferring the first set of data from the transaction pipeline to the bus interface controller.

4. The computer-implemented method according to claim 3, wherein seizing control of the bus interface further comprises issuing a data ready signal from the bus interface controller to the bus interface.

5. The computer-implemented method according to claim 4, wherein seizing control of the bus interface further comprises transferring the first set of data on the bus interface.

6. The computer-implemented method according to claim 2, wherein maintaining control of the bus interface comprises maintaining the defer signal in an active state during deactivation of the defer hold signal.

7. The computer-implemented method according to claim 6, wherein maintaining control of the bus interface further comprises reactivating the defer hold signal.

8. The computer-implemented method according to claim 7, wherein maintaining control of the bus interface further comprises: transferring other sets of data associated with the other defer phase responses from a memory port interface to the transaction pipeline; and transferring the other sets of data from the transaction pipeline to the bus interface controller.

9. The computer-implemented method according to claim 8, wherein maintaining control of the bus interface further comprises issuing a data ready signal from the bus interface controller to the bus interface.

10. The computer-implemented method according to claim 9, wherein maintaining control of the bus interface further comprises transferring the other sets of data on the bus interface.

11. A defer phase response subsystem, comprising:
    a node controller for negotiating bus access for a plurality of processors, the node controller comprising:
        a transaction pipeline adapted to receive a plurality of defer phase responses and coupled to provide a defer signal to indicate the presence of the plurality of defer phase responses, wherein the plurality of defer phase responses comprises a first phase response associated with at processor of a plurality of processors and one or more other defer phase responses associated with the first processor, wherein the other defer phase responses are detected by a look ahead performed by the transaction pipeline; and
        a bus interface controller coupled to the transaction pipeline to receive the plurality of defer phase responses and coupled to transmit data associated with the plurality of defer phase responses on a bus interface, wherein the defer signal causes the bus interface controller to maintain control of the bus interface during transmission of the data associated with the plurality of defer phase responses.

12. The defer phase response subsystem according to claim 11, further comprising a plurality of memory port interfaces coupled to the transaction pipeline to provide the plurality of defer phase responses.

13. The defer phase response subsystem according to claim 12, wherein the transaction pipeline is further adapted to maintain the defer signal in an active state to link the plurality of defer phase responses, the defer signal being deactivated once the data associated with the linked plurality of defer phase responses is depleted.

14. A multiprocessing system, comprising:
    a plurality of multiprocessors processors sharing a common system bus with access to a common memory pool; and
    a single node controller coupled to each of the plurality of processors, the single node controller comprising:
        a transaction pipeline adapted to receive a plurality of defer phase responses and coupled to provide a defer signal to indicate the presence of the plurality of defer phase responses, wherein the plurality of defer phase responses comprises a first phase response associated with one of the processors and one or more other defer phase responses associated with the processor, wherein the other defer phase responses are detected by a look ahead performed by the transaction pipeline; and a bus interface controller coupled to the transaction pipeline to receive the plurality of defer phase responses and coupled to transmit data associated with the plurality of defer phase responses on a bus interface, wherein the defer signal causes the bus interface controller to maintain control of the bus interface during transmission of the data associated with the plurality of defer phase responses.

15. The multiprocessing system according to claim 14, further comprising a plurality of memory port interfaces coupled to the transaction pipeline to provide the plurality of defer phase responses.

16. The multiprocessing system according to claim 15, wherein the transaction pipeline is further adapted to maintain the defer signal in an active state to link the plurality of defer phase responses, the defer signal being deactivated once the data associated with the linked plurality of defer phase responses is depleted.

17. A multiprocessing system having a common system bus accessible to a common memory pool, the multiprocessing system comprising:

central node control means for negotiating common system bus access for a plurality of processors, the node control means comprising:

means for receiving a first defer phase response, the defer phase response being associated with defer phase data accessed from the common memory pool on behalf of a first processor that shares the common memory pool and common bus with one or more other processors of the plurality of processors;

means for controlling the common system bus to facilitate data transfer of the defer phase data associated with the first defer phase response; and means for looking ahead to detect detecting other defer phase responses associated with the first processor, wherein control of the common system bus is maintained by the controlling means during transmission of defer phase data associated with the other defer phase responses.

18. The multiprocessing system of claim 17, wherein the means for receiving a first defer phase response from the common system bus comprises a transaction pipeline.

19. The multiprocessing system of claim 17, wherein the means for controlling the common system bus to facilitate data transfer of the defer phase data comprises a bus interface controller.

20. The multiprocessing system of claim 17, further comprising means for linking a plurality of defer phase responses.

* * * * *